United States Patent
Leblond

(10) Patent No.: US 8,142,177 B2
(45) Date of Patent: Mar. 27, 2012

(54) INSTALLATION FOR BLOW MOULDING HOLLOW BODIES, COMPRISING A PRESSURIZED TEMPERATURE-CONTROLLED FLUID CIRCUIT

(75) Inventor: Roland Leblond, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 384 days.

(21) Appl. No.: 12/504,997

(22) Filed: Jul. 17, 2009

(65) Prior Publication Data
US 2010/0047378 A1   Feb. 25, 2010

(30) Foreign Application Priority Data
Jul. 18, 2008   (FR) .................................... 08 54899

(51) Int. Cl.
*B29C 49/64* (2006.01)
(52) U.S. Cl. ........... 425/182; 249/79; 425/195; 425/526
(58) Field of Classification Search ................. 425/182, 425/195, 526; 249/79
See application file for complete search history.

(56) References Cited

U.S. PATENT DOCUMENTS

| 4,367,785 | A | * | 1/1983 | Allen ................................ 249/79 |
| 5,285,841 | A | * | 2/1994 | Yamauchi et al. ............ 164/348 |
| 6,827,323 | B2 | * | 12/2004 | Minemoto ....................... 249/79 |
| 2008/0118599 | A1 | | 5/2008 | Tonga et al. |
| 2008/0136068 | A1 | | 6/2008 | Leone |

FOREIGN PATENT DOCUMENTS

| DE | 36 13 543 C1 | 12/1986 |
| FR | 2 877 872 A1 | 5/2006 |

* cited by examiner

*Primary Examiner* — Robert B Davis
(74) *Attorney, Agent, or Firm* — Sughrue Mion, PLLC

(57) ABSTRACT

Installation (1) for blow molding hollow bodies, comprising at least one mold carrier (2) to which a removable mold (3) can be connected via fluid connection means (4), at least one pressurized temperature-controlled fluid circuit (5) passing through the carrier and mold, and automatic circuit (5) shutoff means provided in the carrier (2); which circuit (5) has a fluid connection to at least one chamber (8) having a variable volume that depends on an external pressure applied to said chamber (8) by means (9) for generating an auxiliary fluid at a pressure that is adjustable between the pressure of the temperature-controlled fluid and atmospheric pressure, by means of which the pressure of the pressurized temperature-controlled fluid can be reduced in said chamber (8) by decompression.

11 Claims, 1 Drawing Sheet

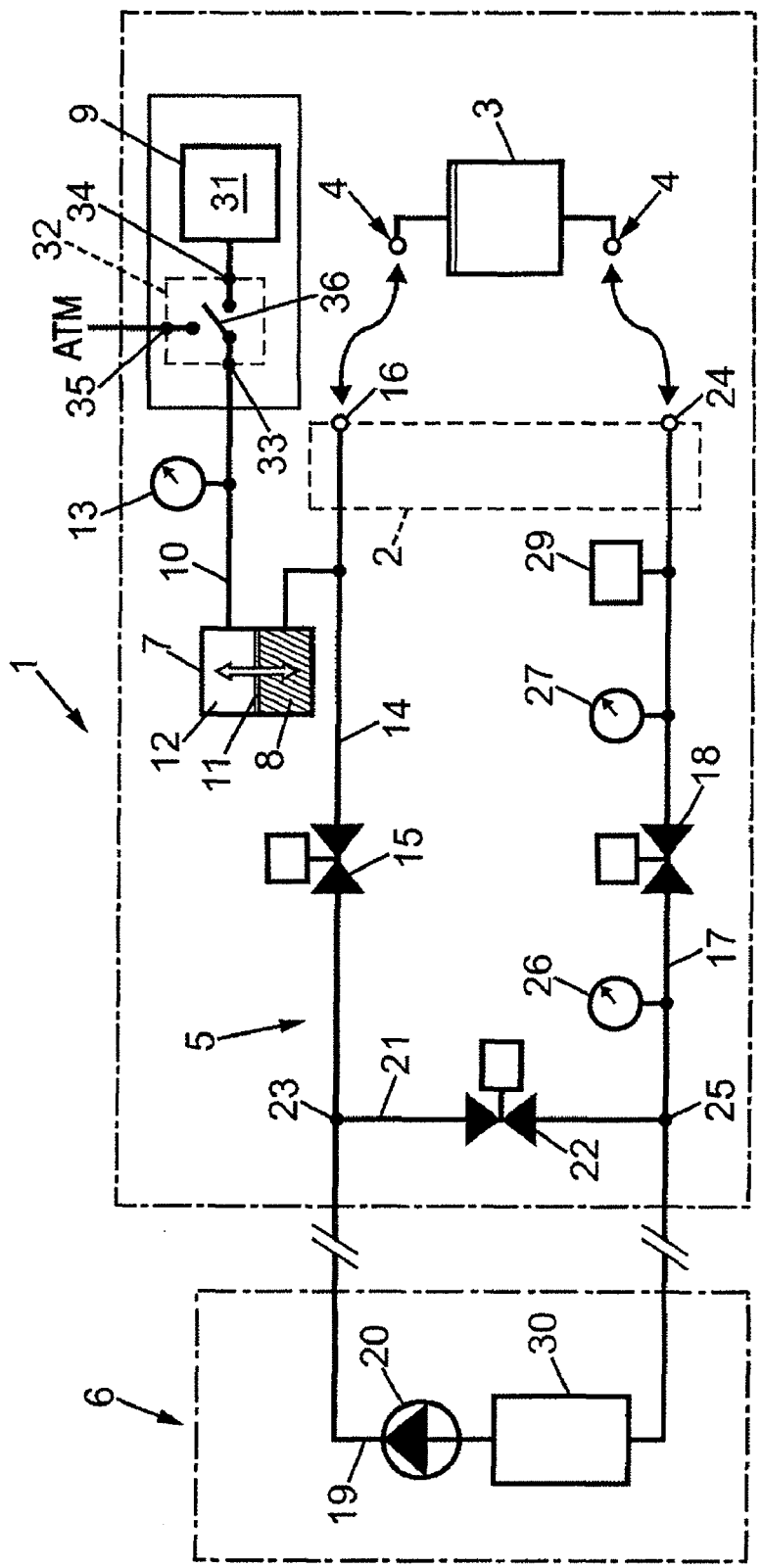

INSTALLATION FOR BLOW MOULDING HOLLOW BODIES, COMPRISING A PRESSURIZED TEMPERATURE-CONTROLLED FLUID CIRCUIT

FIELD OF INVENTION

The present invention relates in general terms to an installation for blow moulding hollow thermoplastic, such as PET, bodies, especially containers such as bottles, which installation has at least one mould carrier to which a removable blowing mould can be connected. The invention relates particularly to an installation of the above type comprising a revolving carousel, on the perimeter of which are a plurality of mould carriers to which a plurality of respective removable blowing moulds can be connected.

More specifically, the invention applies preferably, though not exclusively, to the blow moulding of hot-fillable hollow bodies, that is to say hollow bodies, typically bottles, which must then be filled with a hot liquid (for sterilization) or which, after filling and shutting off, must undergo a heat treatment (for pasteurization).

BACKGROUND

For the blowing moulding of these hollow bodies, which are blown from thermoplastic preforms which are pre-heated in a heat conditioning oven at a temperature higher than their glass transition temperature but lower than their crystallization temperature, the moulds must be heated by circulating a pressurized temperature-controlled fluid (such as water, which can be at a temperature of up to 90° C., or oil, which can be at a temperature of up to 140° C.). This circuit is partly formed in the mould and partly formed in the mould's respective carrier.

To allow rapid modification of the characteristics of a production line for the purpose of making different hollow bodies, it must be possible to change the moulds quickly. Fluid connection means must therefore be provided between the mould and its carrier to allow continuity of this circuit.

However, the temperature-controlled fluid is under pressure inside the circuit. There is therefore a risk of this fluid spraying out of the carrier when the mould is disconnected from its respective carrier. To solve this problem, it is prior art for the circuit to be fitted with automatic shutoff means. As a rule, these automatic shutoff means are operated automatically whenever the blow-moulding installation is stopped (in an emergency stop, for example, or when a stop is required for maintenance work on the installation). These automatic shut-off means are also tripped when the maintenance worker opens the doors giving access to the heart of the blow-moulding installation.

However, despite the presence of these automatic shutoff means, there is still a risk of hot high-pressure fluid being sprayed out of the carrier when the mould is disconnected in the event that these shutoff means fail and there is residual pressure in the mould.

In addition, the temperature-controlled fluid stays at pressure inside the circuit after the mould has been disconnected from its respective carrier. It is therefore relatively difficult to reconnect the mould to its respective carrier, because considerable force must be exerted against this pressure.

To eliminate this problem and ensure that the temperature-controlled fluid does not remain pressurized inside the circuit formed partly within the carrier, it is known practice to provide a valve for bleeding some of the temperature-controlled fluid from the circuit. This bled fluid is then usually thrown away and lost. This approach is not therefore satisfactory either, especially if the temperature-controlled fluid is oil, the temperature of which may be above 100° C., because bleeding always involves a risk of the liquid being sprayed out and burning the maintenance worker. In any case, this approach is not satisfactory from an environmental point of view.

There is therefore a desire in practice, in the case of these moulding installations, for the mould or each mould to be fitted with a pressurized temperature controlled fluid circuit so designed as to reduce the risk of hot fluid being sprayed out at pressure when the mould is disconnected from its respective carrier, and at the same time for it to be made easier to connect the mould to its carrier.

SUMMARY OF CERTAIN OBJECTS OF THE INVENTION

To these ends, it is an object of the invention to improve an installation for blow moulding hollow thermoplastic bodies, especially containers such as bottles, comprising at least one mould carrier to which a respective removable mould can be connected via fluid connection means, this installation comprising at least one pressurized temperature-controlled fluid circuit passing through at least said carrier and said respective mould, and automatic means for shutting off said circuit being provided in at least said carrier, which installation, being constructed in accordance with the invention, is characterized in that it comprises:

at least one enclosure that comprises at least one variable-volume chamber provided with a fluid connection to said pressurized temperature-controlled fluid circuit, and
  adjustably pressurized auxiliary fluid generating means able to vary between a maximum pressure substantially equal to the pressure of the pressurized temperature controlled fluid present in said circuit and a minimum pressure substantially equal to atmospheric pressure, said generating means being connected to said enclosure outside of said chamber in such a way that said variable-volume chamber is subjected to the opposing pressure of said adjustable-pressure auxiliary fluid.

By these means, before the mould is disconnected from its respective carrier, the opposing pressure of said auxiliary fluid can be reduced from its maximum pressure to substantially its minimum pressure, and the pressure of the pressurized temperature-controlled fluid can be reduced in said variable-volume chamber until it is substantially atmospheric pressure. This reduces the risk of pressurized temperature-controlled fluid being sprayed out of the carrier if the mould is disconnected from its respective carrier when said means for automatically shutting off said circuit are not working.

In one advantageous embodiment, said enclosure comprises a movable internal wall separating said enclosure into two chambers of variable respective volumes, said first chamber having a fluid connection to said pressurized temperature-controlled fluid circuit and a second chamber having a fluid connection to said adjustably pressurized auxiliary fluid generating means.

In one possible example of an embodiment, said enclosure may be a bladder comprising a deformable internal diaphragm defining said first and second chambers. However, it would seem more advantageous for said enclosure to be a substantially rigid enclosure. In this case, one possibility is for said enclosure to be a substantially rigid enclosure comprising a deformable internal diaphragm defining said first and second chambers. Another advantageous possibility is for said enclosure to be a substantially rigid enclosure comprising a movable internal wall defining said first and second chambers; a preferred illustrative embodiment may then be for said enclosure to be constructed in the form of a cylinder with a piston defining said first and second chambers.

In one practical example of an embodiment that is simple to construct and operate, said auxiliary fluid generating means operate on an all-or-nothing basis and can selectively either deliver an auxiliary fluid at a pressure substantially equal to that of the temperature controlled fluid in said temperature-controlled fluid circuit, or connect said second chamber to atmosphere. In this case, one concrete embodiment may be for said auxiliary fluid generating means to comprise:

- a generator of auxiliary fluid at a pressure substantially equal to that of the temperature controlled fluid in said temperature-controlled fluid circuit, and
- a selection valve having
  - an outlet orifice connected to said second chamber,
  - a first inlet orifice connected to said auxiliary fluid generator,
  - a second inlet orifice connected to atmosphere, and
  - a selector able to establish a connection between said outlet orifice and, as selected,
    - either the first or the second inlet orifice.

To enable the temperature-controlled fluid to be reduced to atmospheric pressure in the temperature-controlled fluid circuit, it is desirable for the second pressurized fluid circuit to comprise means for venting said pressurized auxiliary fluid to the exterior.

In one practical embodiment, the temperature controlled fluid circuit may comprise:

a first main line comprising a valve, said enclosure being provided with a fluid connection to said first main line between said valve and a connection for said means of fluid connection of the carrier to a respective mould;

a second main line comprising a valve and connectable 5 to said first main line via said fluid connection means and said mould;

a transverse temperature-controlling line connecting said first and second main lines, which bypass line includes a pressurized fluid temperature controller and means for pumping said pressurized temperature-controlled fluid around said circuit; and a transverse bypass line connecting said first and second main lines, which line includes a valve which, in its closed position, allows the pressurized temperature-controlled fluid to flow through said transverse temperature-controlling line, through the first and second main lines, and through the mould connected to its respective carrier, said valve on said first main line being positioned between said enclosure and a connection of said transverse bypass line while said valve on said second main line is positioned between a connection for said means of fluid connection of the carrier to a respective mould and a connection to the transverse bypass line.

In order that the operation of the valve on the second main line can be checked, said second main line may advantageously comprise two manometers positioned one on either side of said valve connected to said second main line.

As an additional safety measure, so that the operation of the valve on the second main line can be checked, a pressure switch may be provided on the second main line between the valve on the second main line and said connection for said means of fluid connection of the carrier to said second main line.

BRIEF DESCRIPTION OF THE FIGURE

The present invention will be understood more clearly on reading the following description of a preferred example, which is purely illustrative and in no way limits the scope of the invention. The description refers to the appended drawing, in which:

FIG. 1 is a diagram of a temperature-regulated fluid circuit formed in a blow-moulding installation according to the invention.

DETAILED DESCRIPTION OF NON-LIMITING EMBODIMENTS OF THE INVENTION

In the diagram, FIG. 1, an installation 1 (shown diagrammatically as a block) for blow moulding hollow thermoplastic bodies, notably containers such as bottles, comprises at least one mould carrier 2 (shown diagrammatically as a block) to which a removable blowing mould 3 (shown diagrammatically in the form of a block) can be detachably connected. Common practice for long runs is for the installation 1 to be set up as a rotating carousel, around the perimeter of which are a plurality of mould carriers 2 to which a plurality of respective removable blowing moulds 3 can be detachably connected.

Each carrier 2 comprises means 4 for fluid connection to a respective mould 3, thereby allowing the formation of at least one circuit 5 for the circulation of a pressurized temperature-controlled fluid through at least one of said carriers 2 and one of said respective moulds 3, the temperature of the fluid being controlled by temperature control means 6. At least two moulds 3 may optionally be connected to the same temperature controlling fluid circuit 5.

The temperature-controlled fluid may be either water or oil and is thus used to heat the mould, the channels carrying said temperature-controlled fluid being machined through the mould.

In a manner known per se, automatic circuit 5 shutoff means are provided in the carrier 2. These automatic shutoff means may for example be in the form of an automatically shutting off stop valve and are actuated when the installation 1 stops, e.g. either following a technical incident in the installation 1, or following opening of the doors giving access to the heart of the installation 1.

The temperature-controlled fluid circuit 5 is connected in such a way as to allow fluid communication with an enclosure 7 comprising a variable-volume chamber 8.

Adjustably pressurized auxiliary fluid generating means 9 are able to vary the pressure of said auxiliary fluid between a maximum pressure substantially equal to the pressure of the pressurized temperature-controlled fluid present in said circuit 5 and a minimum pressure substantially equal to atmospheric pressure. Said generating means 9 are connected to the enclosure 7 outside of the chamber 8 in such a way that said variable-volume chamber 8 is subjected to the opposing pressure of said adjustable-pressure auxiliary fluid.

Thus, before the mould 3 is disconnected from its respective carrier 2, the opposing pressure of said auxiliary fluid is reduced from its maximum pressure to substantially its minimum pressure, and the pressure of the pressurized temperature-controlled fluid can be reduced in said variable-volume chamber 8 until it is substantially atmospheric pressure. When the mould 3 disconnects, the pressure of the temperature-controlled fluid in the circuit 5 has therefore been lowered to substantially atmospheric pressure and, even if the automatic circuit 5 shutoff means fail, the risk of pressurized temperature-controlled fluid being sprayed out of the carrier 2 has been reduced.

More precisely, the adjustably pressurized auxiliary fluid generating means 9 can be incorporated into a second circuit 10 for pressurized auxiliary fluid, such as compressed air. The second circuit 10 may advantageously comprise means for exhausting said pressurized auxiliary fluid to the exterior.

Although many embodiments may be envisaged for the enclosure 7 containing the variable-volume chamber 8, one embodiment that looks promising in practice in an industrial context is for the enclosure 7 to comprise a completely sealed internal wall 11, either movable or deformable, separating said enclosure 7 into two chambers 8 and 12 with respective variable internal volumes. One chamber, which is the same chamber 8 referred to earlier, is provided with a fluid connection to the pressurized temperature-controlled fluid circuit 5; and a second chamber 12, separated from said chamber 8 by the wall 11, is provided with a fluid connection to the adjustably pressurized auxiliary fluid generating means 9, particularly to the second or pressurized auxiliary fluid circuit 10.

In one possible embodiment (not shown), the enclosure 7 can be a bladder with a wall 11 in the form of a deformable integral diaphragm (e.g. of rubber) defining said first and second chambers 8, 12.

In one advantageous embodiment, said enclosure 7 may be a substantially rigid enclosure. In this case one possibility is for the enclosure 7 to be a substantially rigid enclosure comprising a wall 11 in the form of e.g. a deformable internal diaphragm defining said first and second chambers 8, 12. Another advantageous possibility, as shown in FIG. 1, is for said enclosure 7 to be a substantially rigid enclosure comprising a movable internal wall 11 defining said first and second chambers 8, 12; a preferred illustrative embodiment would then be for said enclosure 7 to be constructed in the form of a cylinder, with the wall 11 being a moving piston defining said first and second chambers 8, 12.

As shown in FIG. 1, the second or pressurized auxiliary fluid circuit 10 can include a manometer 13 to measure the pressure of said auxiliary fluid injected at pressure into the second chamber 12 of the enclosure 7.

Although in principle the generating means 9 may be designed to deliver an auxiliary fluid at any adjustable pressure, it is however simpler (and perfectly adequate for requirements) for said auxiliary fluid generating means 9 to operate on an all-or-nothing basis, so as selectively either to deliver an auxiliary fluid at a pressure substantially equal to the pressure of the temperature-controlled fluid in said temperature controlled fluid circulation circuit 5, or to connect said second chamber 12 to atmosphere ATM.

In concrete terms, said auxiliary fluid generating means 9 may comprise, as illustrated in FIG. 1:

a generator 31 of auxiliary fluid at a pressure substantially equal to the pressure of the temperature-controlled fluid in said temperature controlled fluid circuit 5, and
a selection valve 32 having
   an outlet orifice 33 connected to said second chamber 12,
   a first inlet orifice 34 connected to said auxiliary fluid generator 31,
   a second inlet orifice 35 connected to atmosphere ATM, and
   a selector 36 for connecting said outlet orifice 33 to either the first 34 or the second 35 inlet orifice.

The switching of the selector 36 from one outlet orifice to the other is connected to the stop/start command of the installation so that venting the second chamber 12 to atmosphere ATM occurs automatically when the installation receives a stop command, and conversely the chamber 12 is connected automatically to the pressurized auxiliary fluid generator 31 when the installation is switched on. Moreover, the switching of the selector 36 to the outlet orifice 35 connected to the atmosphere ATM may preferably be linked to a stop command to the pressurized auxiliary fluid generator 31.

In a practical illustrative embodiment shown in FIG. 1, the temperature-controlled fluid circuit 5 comprises:

- a first main line 14 comprising a valve 15 (preferably solenoid-operated), and the enclosure 7 is provided with a fluid connection to this first main line 14 between the valve 15 and a connection 16 for said means 4 of fluid connection of the carrier 2 to a mould 3;
- a second main line 17 comprising a valve 18 (preferably solenoid-operated), and connectable to the first main line 14 via said fluid connection means 4 and the mould 3;
- a transverse temperature-controlling line 19 connecting the first main line 14 to the second main line 17, which line 19 contains the temperature control means 6 which may comprise a fluid temperature controller 30 (which may be of any type known per se)
and means 20 for pumping the fluid around the temperature-controlled fluid circuit 5; and
- a transverse bypass line 21 connecting the first main line 14 to the second main line 17, on which line 21 is a valve 22 (preferably solenoid-operated), which, in its closed position, allows the temperature controlled fluid to flow through the transverse temperature-regulating line 19, through the first and second main lines 14, 17 and through the mould 3 connected to its respective carrier 2, the valve 15 on the first main line 14 being positioned between the enclosure 7 and a connection 23 of the transverse bypass line 21 while the valve 18 on the second main line 17 is positioned between a connection 24 for the means 4 of fluid connection of the carrier 2 to a respective mould 3 and a connection 25 to the transverse bypass line 21.

The second main line 17 comprises two manometers 26, 27 positioned one on either side of the valve 18 in the second line 17, and more specifically a first manometer 26 connected between the connection 25 of the transverse bypass line 21 and the valve 18 of the second main line 17 and a second manometer connected between the valve 18 of the second main line 17 and a connection 24 for the means 4 of fluid connection of the respective carrier 2. It is thus possible to check that the valve 18 on the second main line 17 is working correctly by the presence of these manometers 26, 27 on either side of the valve 18.

To ensure that the valve 18 has closed the second main line 17, and as an extra safety measure, a pressure switch 29 can be provided on the second main line 17 between the valve 18 on the second main line 17 and the connection 24 for the means 4 of fluid connection of the carrier 2, more specifically between the manometer 27 and the connection 24.

With the hollow-body blow-moulding installation 1 as described above, it is thus possible to adjust the pressure of a fluid in a temperature-controlled fluid circuit 5 by varying the volume of temperature-controlled fluid in the enclosure 7 which contains at least one variable-volume chamber 8, and modifying the pressure on the volume of temperature-controlled fluid enclosed in the chamber 8 of the enclosure 7.

More specifically, following a stoppage of the blow-moulding installation 1, and in order to disconnect the mould 3 from its carrier 2 without the risk of pressurized temperature-controlled fluid being sprayed 10 out, the procedure is as follows:

the valve 15 on the first main line 14 is closed and the valve 18 on the second main line 17 is closed;
   the valve 22 on the transverse bypass line 21 is opened, thus forming a closed loop in the circuit 5, more specifically in the temperature-controlling part of the circuit 5, through which the fluid whose temperature is to be controlled can flow (the closed loop advantageously comprises the transverse bypass line 21 and the transverse temperature-controlling line 19). Pump means 20 advantageously enable continuous circulation of the temperature-controlled fluid around the closed loop, making it possible to avoid overheating and deterioration of this temperature-controlled fluid in contact with the temperature controller heating resistor 30, and such deterioration could result from stagnation of the temperature-controlled fluid in contact with the heating resistor, especially if the temperature controlled fluid is oil;

a pressure that is less than the pressure of the temperature-controlled fluid in the circuit 5 is generated in the chamber 8 of the enclosure 7. Generally speaking, the second circuit 10 is set at atmospheric pressure using the exhaust means with which said second circuit is provided and/or the generating means 9; at which point the manometer 13 indicates zero pressure; and the pressure of the pressurized temperature-controlled fluid is lowered in the enclosure 7, resulting in a simultaneous increase in the volume of the temperature-controlled fluid in the chamber 8 of the enclosure 7. In this way the pressure of the temperature-controlled fluid present in the part of the circuit 5 to which the enclosure 7 is connected drops to the pressure generated by the second circuit 10, which is generally atmospheric pressure. There is now no risk of temperature-controlled fluid being sprayed out of the circuit 5 at the moment when the mould 3 is disconnected from its carrier 2.

Similarly, following attachment or connection of the mould 3 to its respective carrier 2, and in order to allow the blow-moulding installation 1 to be started again, the following procedure may be followed:

a pressure greater than the pressure of the temperature-controlled fluid in the circuit 5 is applied to the volume of temperature-controlled fluid present in the chamber 8 of the enclosure 7 (a pressure substantially equal to the pressure of the fluid flowing around the closed loop of the circuit 5 made up of the transverse temperature-controlling line 19 and the transverse bypass line 21 is applied); the pressurized temperature-controlled fluid in the enclosure 7 is pressurized, causing the volume of the temperature-controlled fluid to shrink in the chamber 8, the volume of which decreases. The temperature-controlled fluid is thus pressurized in the circuit 5 after the mould 3 has been connected to the circuit 5. As a result, the mould 3 is now connected to a circuit 5 whose fluid is not yet pressurized, and this fluid is not pressurized until the mould 3 is connected to its carrier 2, so that there is no longer any need to develop opposing pressure loads in order to connect the mould 3 to its carrier 2; and the valve 15 on the first main line 14 is opened, the valve 18 on the second main line 17 is opened, and the valve 22 on the transverse bypass line 21 is closed.

There exist therefore according to the invention means for shutting off the pressurized temperature-controlled fluid circuit 5 which consist of valves 15, 18 on the first and second main lines 14, 17 and which make it possible to form a part of the circuit 5, containing the mould 3 and the enclosure 7, where the pressure of the fluid can be controlled by reducing it in the enclosure 7. It is therefore possible to reduce the pressure of the fluid flowing through the mould 3 and so reduce the risk of this fluid being sprayed out when the mould 3 is disconnected from its carrier 2.

The invention claimed is:

1. An installation for blow moulding hollow thermoplastic bodies, comprising at least one mould carrier to which a respective removable mould can be connected via fluid connection means, said installation comprising at least one pressurized temperature-controlled fluid circuit passing through at least said carrier and said respective mould, and automatic means for shutting off said circuit being provided in at least said carrier, wherein said installation comprises:

at least one enclosure comprising at least one variable-volume chamber provided with a fluid connection to said pressurized temperature-controlled fluid circuit, and generating means for generating an adjustably pressurized auxiliary fluid able to vary between a maximum pressure substantially equal to a pressure of a pressurized temperature-controlled fluid present in said circuit and a minimum pressure substantially equal to atmospheric pressure, said generating means being connected to said enclosure outside of said variable-volume chamber in such a way that said variable-volume chamber is subjected to an opposing pressure of said adjustable pressure auxiliary fluid, by which generating means, before said mould is disconnected from said mould respective carrier, said opposing pressure of said auxiliary fluid is reduced from said maximum pressure to substantially said minimum pressure, and said pressure of said pressurized temperature-controlled fluid can be reduced in said variable-volume chamber until said pressure is substantially atmospheric pressure, in such a way as to reduce the risk of pressurized temperature-controlled fluid being sprayed out of said carrier if said mould is disconnected from said mould respective carrier when said means for automatically shutting off said circuit are not working.

2. The installation according to claim 1, wherein said enclosure comprises a movable internal wall separating said enclosure into two chambers of variable respective volumes, said variable-volume chamber being a first chamber having a fluid connection to said pressurized temperature-controlled fluid circuit and a second variable-volume chamber having a fluid connection to said adjustably pressurized auxiliary fluid generating means.

3. The installation according to claim 2, wherein said enclosure is a bladder comprising a deformable internal diaphragm defining said first and second variable-volume chambers.

4. The installation according to claim 2, wherein said enclosure is a substantially rigid enclosure comprising a deformable internal diaphragm defining said first and second variable-volume chambers.

5. The installation according to claim 2, wherein said enclosure is a substantially rigid enclosure comprising a movable internal wall defining said first and second variable-volume chambers.

6. The installation according to claim 5, wherein said enclosure is a cylinder with a piston defining said first and second variable-volume chambers.

7. The installation according to claim 2, wherein said auxiliary fluid generating means operate on an all-or-nothing basis and can selectively either deliver said auxiliary fluid at a pressure substantially equal to that of said temperature-controlled fluid in said temperature-controlled fluid circuit, or connect said second variable-volume chamber to atmosphere.

8. The installation according to claim 7, wherein said auxiliary fluid generating means comprises:

a generator of said auxiliary fluid at a pressure substantially equal to that of said temperature-controlled fluid in said temperature-controlled fluid circuit, and a selection valve having
an outlet orifice connected to said second variable-volume chamber,
a first inlet orifice connected to said auxiliary fluid generator
a second inlet orifice connected to atmosphere, and
a selector for connecting said outlet orifice to either the first or the second inlet orifice.

9. The installation according to claim 1, wherein said pressurized temperature-controlled fluid circuit comprises:
a first main line comprising a first valve, said enclosure being provided with a fluid connection to said first main line between said first valve and a first connection for said fluid connection means of said carrier to a respective mould;
a second main line comprising a second valve and connectable to said first main line via said fluid connection means and said mould;
a transverse temperature-controlling line connecting said first and second main lines, which temperature-controlling line includes a pressurized fluid temperature controller and means for pumping said pressurized temperature-controlled fluid around said circuit; and
a transverse bypass line connecting said first and second main lines, which bypass line includes a third valve which, in closed position, allows said pressurized temperature-controlled fluid to flow through said transverse temperature-controlling line, through said first and second main lines, and through said mould connected to said respective carrier, said first valve on said first main line being positioned between said enclosure and a second connection of said transverse bypass line while said second valve on said second main line is positioned between a third connection for said fluid connection means of said carrier to said respective mould and a fourth connection to said transverse bypass line.

10. The installation according to claim 9, wherein said second main line comprises two manometers positioned one on either side of said second valve connected to said second main line.

11. The installation according to claim 9, wherein a pressure switch is provided on said second main line between said second valve on said second main line and said third connection for said fluid connection means of said carrier to said second main line.

* * * * *